United States Patent
Agrawal et al.

(10) Patent No.: US 11,030,590 B2
(45) Date of Patent: *Jun. 8, 2021

(54) OPENING A DATA PIPE FOR AN ELECTRONIC TRANSACTION

(71) Applicant: MOTOROLA MOBILITY LLC, Chicago, IL (US)

(72) Inventors: Amit Kumar Agrawal, Bangalore (IN); Mayank Gupta, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 945 days.

This patent is subject to a terminal disclaimer.

(21) Appl. No.: 15/245,494

(22) Filed: Aug. 24, 2016

(65) Prior Publication Data

US 2018/0060838 A1    Mar. 1, 2018

(51) Int. Cl.
| | | |
|---|---|---|
| *H04W 76/20* | (2018.01) | |
| *H04W 12/08* | (2021.01) | |
| *G06Q 20/20* | (2012.01) | |
| *H04W 76/12* | (2018.01) | |
| *G06Q 20/10* | (2012.01) | |

(Continued)

(52) U.S. Cl.
CPC ........... *G06Q 20/102* (2013.01); *G06Q 20/20* (2013.01); *G06Q 20/425* (2013.01);
(Continued)

(58) Field of Classification Search
CPC ............. G06Q 20/3275; G06Q 20/102; G06Q 20/425; G06Q 20/3224; G06Q 10/047;
(Continued)

(56) References Cited

U.S. PATENT DOCUMENTS

| | | | | |
|---|---|---|---|---|
| 7,313,399 B2* | 12/2007 | Rhee | .................. | H04W 40/246 |
| | | | | 455/445 |
| 8,494,910 B2* | 7/2013 | Short | ................ | G06Q 30/0633 |
| | | | | 705/26.25 |

(Continued)

OTHER PUBLICATIONS

"Intelligent Device-to-Device Communication in the Internet of Things", "Oladayo Bello, Member, IEEE, and Sherali Zeadally, Senior Member, IEEE", pp. 1-5, IEEE Systems Journal. (Year: 2014).*

*Primary Examiner* — Christopher Bridges
*Assistant Examiner* — Tony P Kanaan
(74) *Attorney, Agent, or Firm* — Isidore PLLC

(57) ABSTRACT

A method, system, and computer program product for facilitating an electronic transaction between a merchant device and a first device having limited network connectivity. The method includes the first device detecting a transaction trigger that indicates an electronic transaction, that is remotely processed by a transaction service is to occur. The method further includes, identifying a second device within a predetermined proximity of the first device which has a secondary connection to the transaction service that meets a connection service criteria. The method includes establishing a data pipe that directly connects the first device and the second device. In response to the data pipe being established, the first device configures the second device to reroute all transaction data received via the data pipe to the transaction service and transmits the transaction data to the second device to complete the electronic transaction between the first device and the merchant device.

20 Claims, 7 Drawing Sheets

(51) Int. Cl.
*H04L 29/06* (2006.01)
*H04W 4/02* (2018.01)
*H04W 88/04* (2009.01)
*G06Q 20/42* (2012.01)
*H04W 8/00* (2009.01)

(52) U.S. Cl.
CPC .......... *H04L 63/101* (2013.01); *H04L 63/107* (2013.01); *H04W 4/023* (2013.01); *H04W 12/08* (2013.01); *H04W 76/20* (2018.02); *H04W 88/04* (2013.01); *H04W 8/005* (2013.01); *H04W 76/12* (2018.02)

(58) Field of Classification Search
CPC ............. G06Q 30/0261; G06Q 20/322; G06Q 20/3278; G06Q 50/01; H04W 12/08; H04W 88/04; H04W 76/20; H04W 4/023; H04W 76/12; H04W 8/005; H04L 63/107; H04L 63/101
See application file for complete search history.

(56) References Cited

U.S. PATENT DOCUMENTS

| | | | | |
|---|---|---|---|---|
| 9,135,612 B1* | 9/2015 | Proctor, Jr. | ........ | G06Q 20/3278 |
| 9,648,451 B1* | 5/2017 | Lee | ....................... | H04W 4/029 |
| 10,049,349 B1* | 8/2018 | Grassadonia | .......... | G06Q 20/40 |
| 2008/0238610 A1* | 10/2008 | Rosenberg | ......... | G06Q 30/0281 |
| | | | | 340/5.7 |
| 2013/0179352 A1* | 7/2013 | Dwyre | ................. | G06Q 20/327 |
| | | | | 705/71 |
| 2014/0098758 A1* | 4/2014 | Cheng | ..................... | H04W 4/24 |
| | | | | 370/329 |
| 2014/0244009 A1* | 8/2014 | Mestas | ................... | G16H 40/63 |
| | | | | 700/91 |
| 2014/0254499 A1* | 9/2014 | Hassan | ................. | H04W 48/18 |
| | | | | 370/329 |
| 2014/0372300 A1* | 12/2014 | Blythe | ............... | G06Q 20/3676 |
| | | | | 705/41 |
| 2015/0188949 A1* | 7/2015 | Mahaffey | .............. | H04W 12/37 |
| | | | | 726/1 |
| 2015/0282240 A1* | 10/2015 | Visuri | ................... | H04W 4/025 |
| | | | | 370/329 |
| 2015/0339318 A1* | 11/2015 | O'Toole | ............... | G06Q 20/223 |
| | | | | 705/40 |
| 2016/0198509 A1* | 7/2016 | Hayes, Jr. | .............. | G06Q 30/02 |
| | | | | 370/329 |
| 2017/0004474 A1* | 1/2017 | Namura | ............... | G06Q 20/202 |
| 2017/0178090 A1* | 6/2017 | Sarin | .................. | G06Q 20/3224 |
| 2017/0344962 A1* | 11/2017 | Agrawal | ................ | G06Q 20/10 |
| 2018/0329980 A1* | 11/2018 | Ebrahim | ................ | G06F 16/25 |

\* cited by examiner

OPENING A DATA PIPE FOR AN ELECTRONIC TRANSACTION

BACKGROUND

1. Technical Field

The present disclosure generally relates to electronic transactions and in particular to an improved method for facilitating an electronic transaction between a transaction service and a device having limited network connectivity.

2. Description of the Related Art

Electronic and/or mobile payment transactions are common in today's global marketplace. The ubiquity of mobile devices has led to the rise of cloud-based payment services that enable users of mobile devices to quickly exchange funds or perform electronic transactions with other users and/or merchants without the use of a dedicated point of sale terminal. However, one limitation commonly associated with cloud-based transactions between is that both a payer device and a payee device must be connected to a cloud-based payment service in order to complete the transaction. In circumstances where one device does not have an internet connection, such as when one device has poor cellular service connection, the transaction would fail.

BRIEF DESCRIPTION OF THE DRAWINGS

The description of the illustrative embodiments is to be read in conjunction with the accompanying drawings, wherein.

DETAILED DESCRIPTION

Figure 1:
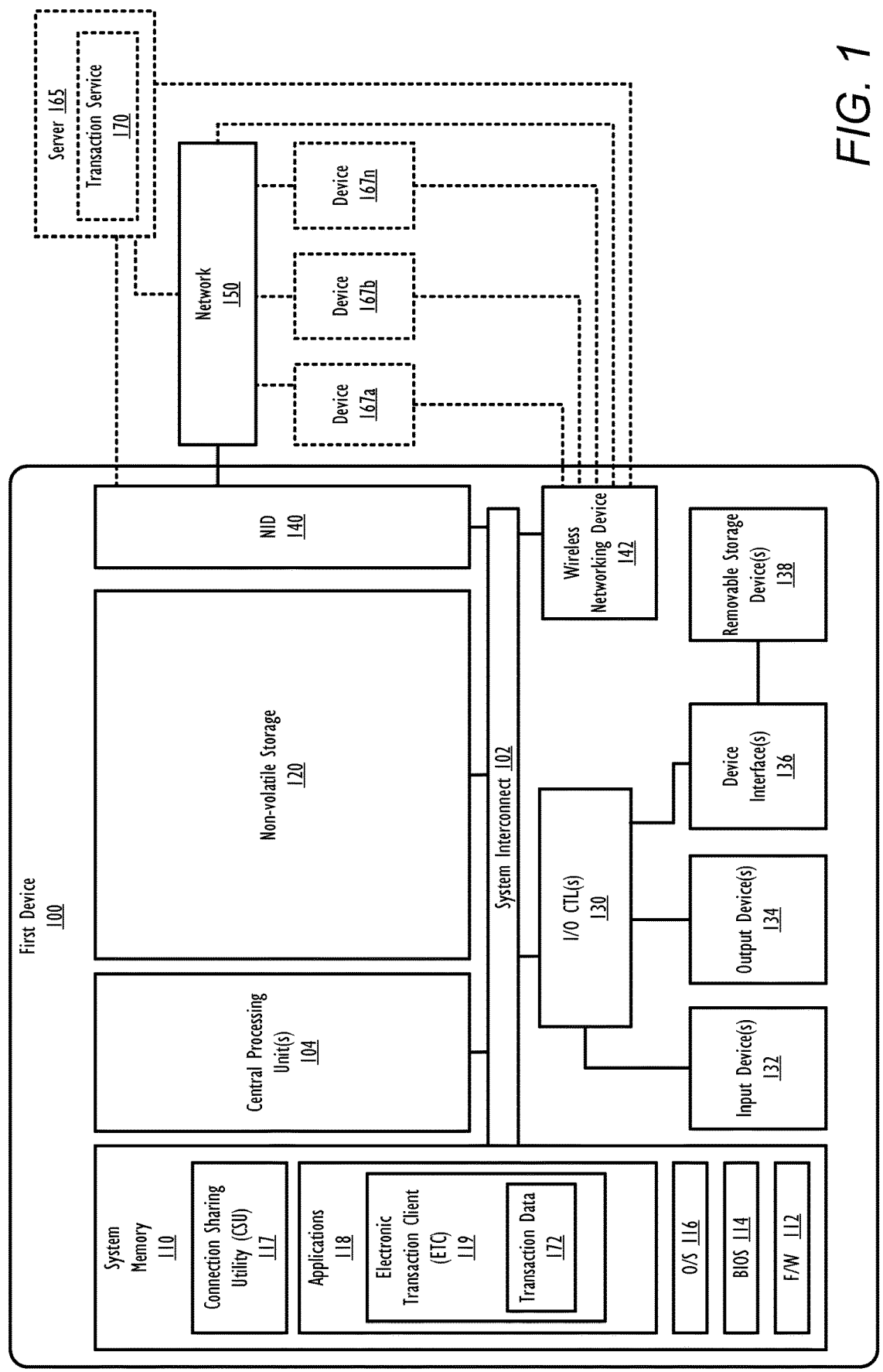
FIG. 1 provides a block diagram representation of an example first device within which certain aspects of the disclosure can be practiced, in accordance with one or more embodiments.

The illustrative embodiments provide a method, system, and computer program product for facilitating an electronic transaction between a merchant device and a first device having limited network connectivity. The method includes the first device detecting a transaction trigger that indicates an electronic transaction, which is remotely processed by a transaction service, is about to occur between the first device and the merchant device. The method also includes identifying whether the first device does not have a connection to the transaction service which meets a connection service criteria. The method further includes in response to identifying the first device as not having a connection to the transaction service which meets the connection service criteria, identifying a second device within a predetermined proximity of the first device and has a second connection to the transaction service that meets the connection service criteria. The method further comprises establishing a data pipe that directly connects the first device and the second device to enable the first device to exchange transaction data with the transaction service using the second device as an intermediary device. In response to the data pipe being established, the first device triggers the second device to reroute, to the transaction service, all transaction data associated received from the first device via the data pipe which is associated with the electronic transaction. The method further includes the first device transmitting the transaction data to the second device via the data pipe, which causes the second device to automatically reroute the transaction data to the transaction service to complete the electronic transaction between the first device and the merchant device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within first device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example first device 100, within which one or more of the described features of the various embodiments of the disclosure can be implemented. In one embodiment, first device 100 can be any electronic device and/or data processing system such as, but not limited to, a desktop computer, notebook computer, mobile phone, smart watch, camera, video recorder, or tablet.

First device 100 includes at least one processor or central processing unit (CPU) 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of first device 100. Specifically, in one embodiment, system memory 110 can include therein a plurality of such modules, including one or more of firmware (F/W) 112, basic input/output system (BIOS) 114, operating system (OS) 116, connection sharing utility (CSU) 117, and application(s) 118. These software and/or firmware modules provide varying functionality when their corresponding program code is executed by CPU 104 or by secondary processing devices within first device 100. In one embodiment, application(s) 118 may include electronic transaction client (ETC) 119, which is configured to initiate and/or execute electronic transactions with at least one other device, including but not limited to, devices 167a-n, server 165, and any other devices connected to network 150. In one embodiment, ETC 119 may interface first device 100 with a remote and/or cloud-based transaction service, such as transaction service 170 of server 165.

CSU 117 executes within first device 100 to perform the various methods and functions described herein. According to one aspect of the disclosure, and as illustrated by FIGS. 3-7, which are described later, an electronic transaction involves a first device, a merchant device, and a transaction service. In the electronic transaction, a second device may operate as an intermediary device to complete, at the transaction service, the electronic transaction. The electronic transaction requires the first device exchange transaction data with the transaction service. The merchant device may optionally access and/or exchange merchant transaction data with the transaction service. As presented herein, first device 100 is utilized as the first device in this transaction. It is appreciated that first device 100 can also be representative of the merchant device, in an alternate embodiment, and the same device can represent or perform the functions of either of the parties to an electronic transaction in alternate embodiments. Thus, CSU 117 can include the required program modules to support both processes.

In one or more embodiments, CSU 117 may be used to transmit, via the data pipe to a second device (device 167a) functioning as an intermediary device, transaction data 172 that is intended for transaction service 170. In this embodiment, CSU 117 triggers the second device (device 167a) to route, to transaction service 170 via an existing connection between second device 167a and transaction service 170, transaction data 172 that is received from first device 100 via the data pipe. The transaction data 172 is data intended for transaction service 170, and second device 167a automatically routes the transaction data 172 on receipt of the data from first device 100. In an alternate embodiment, CSU 117 may configure ETC 119 to transmit, via the data pipe to the intermediary device (device 167a), transaction data 172 that is intended for transaction service 170. CSU 117 may also configure a messaging client on the intermediary device (device 167a) to route, to transaction service 170 via an existing connection, transaction data 172 that is received via the data pipe from first device 100.

For simplicity, CSU 117 is illustrated and described as a stand-alone or separate software/firmware/logic component, which provides the specific functions and methods described herein. However, in at least one embodiment, CSU 117 may be a component of, may be combined with, or may be incorporated within firmware of first device 100, or within OS 116, and/or within one or more of applications 118, particularly ETC 119. In another embodiment, CSU 117 may be a plugin module that integrates within ETC 119, an internet browser of application(s) 118, and/or at least one network protocol layer (not pictured) of first device 100.

First device 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to one or more connected output devices 134, such as monitors/displays and audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with first device 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as an Inter-Integrated Circuit (I²C) Bus, System Management Bus (SMBus), and peripheral component interconnect (PCI) buses.

First device 100 further includes a network interface device (NID) 140 and wireless networking device (WND) 142 that enables first device 100 and/or components within first device 100 to communicate and/or interface with other devices, services, and components that are located external to first device 100. In one embodiment, first device 100 may directly connect to one or more of these external devices, such as server 165 and devices 167a-n, via NID 140. In one or more embodiments, first device 100 may utilize WND 142 to connect, via a wireless connection, to one or more of these external devices, independently from, or in combination with, NID 140. These externally located devices, services, and components can also interface with first device 100 via an external network, such as example network 150, using one or more communication protocols. Network 150 can be a local area network, wide area network, personal area network, and the like, and the connection to and/or between network and first device 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In one or more embodiments, first device 100 may operate as a wireless communication device and WND 142 may be used to transmit data over a wireless network (e.g., a Wireless Fidelity (Wi-Fi) network, cellular network, Bluetooth® network (including Bluetooth® low energy (BLE) networks), a wireless ad hoc network (WANET), or personal area network (PAN)). In one embodiment, first device 100 may be further equipped with an infrared (IR) device (not pictured) for communicating with other devices (e.g., devices 167a-n) using an IR connection. In another embodiment, WND 142 may be a short-range wireless device, including, but not limited to, a near field communication (NFC) device.

Figure 2:
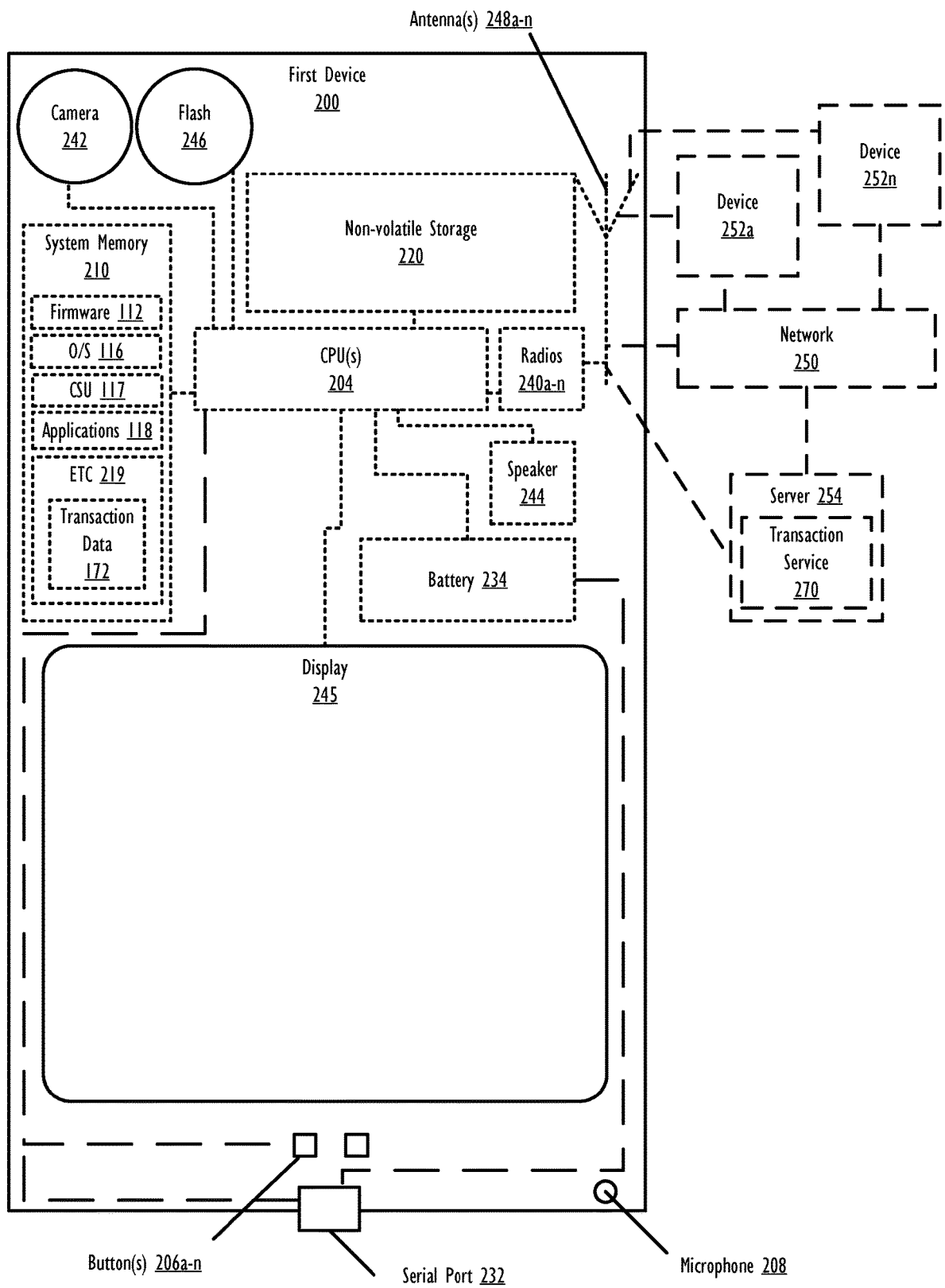
FIG. 2 illustrates a portable device within which certain aspects of the disclosure can be practiced, in accordance with one or more embodiments.

FIG. 2 illustrates an example first device 200, which is a portable device, within which one or more of the described features of the various embodiments of the disclosure can be implemented. First device 200 includes at least one processor or central processing unit (CPU) 204. CPU 204 is coupled to memory 210 and/or non-volatile storage 220, within which firmware 112, CSU 117, and ETC 219 can be stored for execution on CPU 204. According to one aspect, CSU 117 executes within first device 200 to perform the various methods and functions described herein. For simplicity, CSU 117 is illustrated and described as a stand-alone or separate software/firmware/logic component, which provides the specific functions and methods described below. In one embodiment, the various methods and functions provided by CSU 117 that are described herein may be performed by one or more different devices within first device 200 which are collectively referred to as a transceiver (for simplicity). In one embodiment, ETC 219 is configured to initiate and/or execute electronic transactions with at least one other device, including but not limited to, devices 252a-n, server 254, and any other devices connected to network 250. In one embodiment, ETC 219 may interface with a remote and/or cloud-based transaction service such as transaction service 270 of server 254.

As shown, first device 200 comprises several input devices and output devices that enable a user to interface with first device 200. In the illustrated embodiment, first device 200 includes camera sensor 242, flash 246, display 245, hardware buttons 206a-n, microphone 208, and speaker 244. In one embodiment, at least one of camera sensor 242 and microphone 208 may be used independently or in conjunction with each other to capture audio, image, and/or video media. Microphone 208 may be used to receive spoken input/commands from a user. Speaker 244 is used to output audio.

Hardware buttons 206a-n are selectable buttons which are used to receive manual/tactile input from a user to control specific operations of first device 200 and/or of applications executing thereon. In one embodiment, hardware buttons 206a-n may also include or may be connected to one or more sensors (e.g. a fingerprint scanner) and/or be pressure sensitive. Hardware buttons 206a-n may also be directly associated with one or more functions of a graphical user interface (not pictured) and/or functions of an OS, application, or hardware of first device 200. In one embodiment, hardware buttons 206a-n may include a keyboard.

First device 200 also includes display 245, which is capable of displaying text, media content, and/or a graphical user interface (GUI) of firmware and/or one or more applications executing on first device 200. In one embodiment, display 245 is a touch screen that is also capable of receiving touch input from a user of first device 200 while interfacing with a displayed GUI. The GUI can be rendered by CPU 204 for viewing on display 245. In one embodiment, the GUI may include a virtual keyboard for receiving touch input in combination with display 245.

In at least one embodiment, first device 200 can include a plurality of virtual buttons or affordances that operate in addition to or in lieu of hardware buttons 206a-n. For example, first device 200 can be equipped with a touch screen interface and provide a virtual keyboard or other virtual icons for user interfacing therewith.

First device 200 also includes serial port 232 (e.g., a USB (universal serial bus) port) which can operate as one of an input port, an output port, and a combination input/output port. Serial port 232 allows a direct physical connection to and communication of data with a second device. In one embodiment, serial port 232 may also operate as a charging port that receives power via an external charging device (not pictured) for charging battery 234. Battery 234 may include a single battery or multiple batteries for providing power to components of first device 200. In one embodiment, battery 234 may include at least one battery that is removable and/or replaceable by an end user. In another embodiment, battery 234 may include at least one battery that is permanently secured within first device 200. First device 200 may also include inductive charging components (not pictured) for performing a wireless (inductive) charging of the battery.

First device 200 also includes one or more wireless radios 240a-n and can include one or more antenna(s) 248a-n that enable first device 200 to wirelessly connect to, and transmit and receive voice communication and/or data with, one or more other devices, such as devices 252a-n and server 254. In one or more embodiments, wireless radios 240a-n include at least one transceiver for exchanging data with one or more other devices. As a wireless device, first device 200 can transmit data over a wireless network 250 (e.g., a Wi-Fi network, cellular network, Bluetooth® network (including Bluetooth® low energy (BLE) networks), a wireless ad hoc network (WANET), or personal area network (PAN)). In one embodiment, first device 200 may be further equipped with an infrared (IR) device (not pictured) for communicating with other devices using an IR connection. In another embodiment, wireless radios 240a-n may include a short-range wireless device, including, but not limited to, a near field communication (NFC) device. In still another embodiment, first device 200 may communicate with one or more other device(s) using a wired or wireless USB connection.

Figure 3:
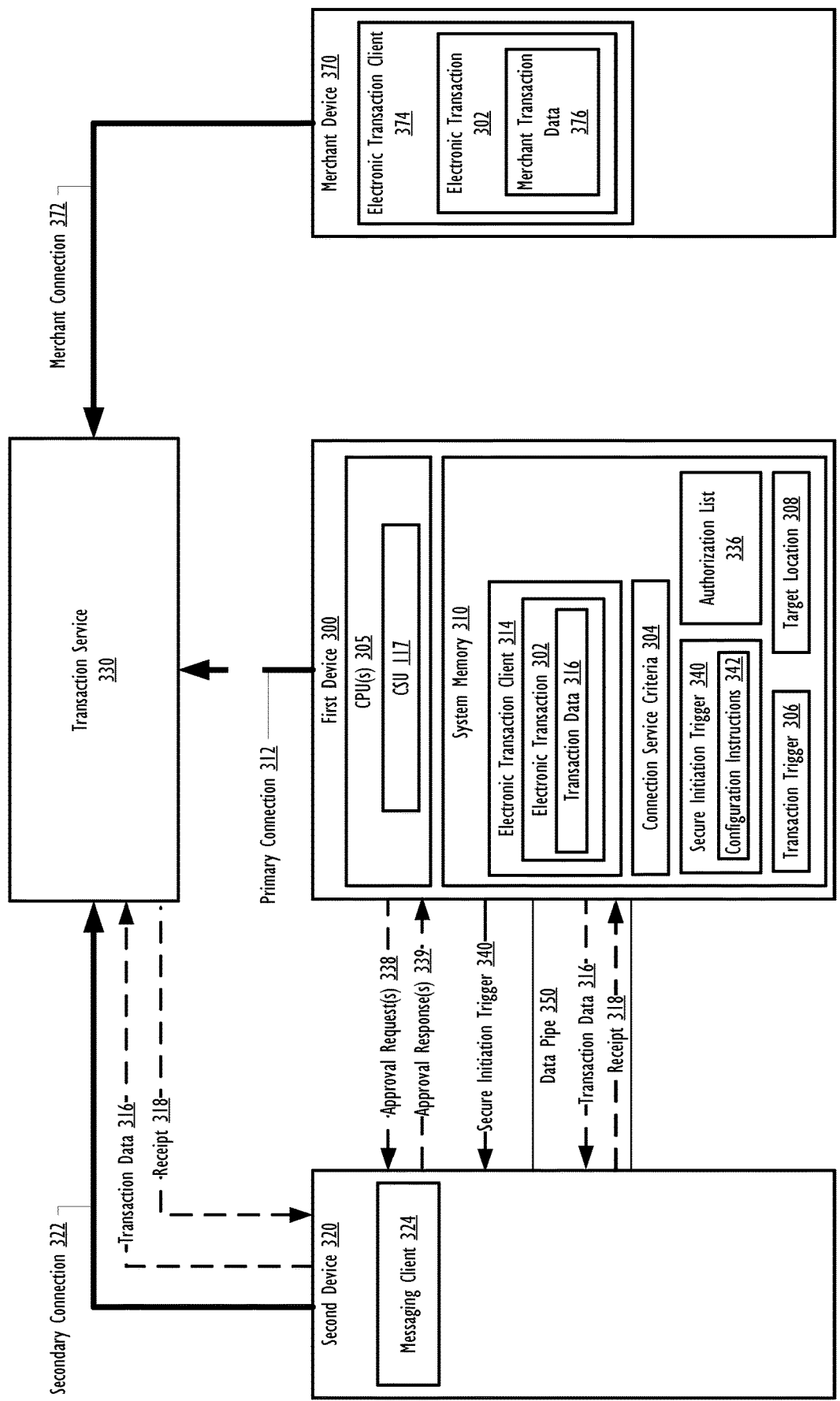
FIG. 3 illustrates an example first device configured to transmit transaction data for an electronic transaction to a second device for rerouting to a transaction service, in accordance with one or more embodiments.

FIG. 3 is a block diagram illustrating the directional flow of processes and data during an electronic transaction between first device 300 and merchant device 370. It should be noted that first device 300 and second device 320 may be configured as first device 100, first device 200, or another electronic device that includes the functional hardware and software components to execute CSU 117. For consistency in the description thereof, first device 300 is assumed to be similar to first device 200 and include similar components. First device 300 includes CPU(s) 305, which executes CSU 117, and system memory 310. As illustrated by FIG. 3, system memory 310 includes electronic transaction client (ETC) 314, and connection service criteria 304, which establishes a set of requirements for a connection with transaction service 330 that is to be used for processing an electronic transaction. A connection between a device and transaction service 330 that does not meet connection service criteria 304 is identified as a connection that is not to be used for the exchange of transaction data. It should also be noted that a lack of any connection to transaction service 330 also constitutes a failure to satisfy connection service criteria 304.

In one or more embodiments, connection service criteria 304 establishes a minimum throughput and/or speed for a connection to transaction service 330. In another embodiment, connection service criteria 304 establishes a maximum number of connection hops/intermediate connections for a connection between a device and transaction service 330. In another embodiment, connection service criteria 304 establishes, at least one of: at least one permitted type of connection, at least one restricted type of connection, a minimum connection security level, a minimum connection reliability, and an amount of data that is required to be transmitted and received to complete the electronic transaction. It is appreciated that other parameters may be utilized, in alternate embodiments, to determine connection service criteria 304, without limitation.

Data pipe 350, which is described in greater detail below, is a particular connection between first device 300 and second device 320 that is utilized by first device 300 to transmitting transaction data 316 to second device 320 for rerouting by second device 320 to transaction service 330. In one embodiment, transaction service 330 is provided as a computer system executing specific code that enables transaction service 330 to function as a server (e.g. server 165 and server 254) that processes peer-to-peer electronic transactions between two parties. In one or more embodiments, transaction service 330 is provided by a device/server associated with a financial entity, such as a bank or credit card company. Electronic transaction 302 is received at and processed by transaction service 330, in accordance with one or more embodiments.

In the described embodiments, transaction service 330 processes electronic transaction 302 between first device 300 and merchant device 370 in response to receiving, from respective electronic transaction client (ETC) 314 and ETC 374, transaction data 316 and merchant transaction data 376, respectively. ETC 314 and ETC 374 are each associated with a respective client, account, business, and/or user. ETC 314 and ETC 374 provide access, during an authenticated login, to funds and/or resources associated with the respective client, account, business, and/or user. In response to initiation of electronic transaction 302, ETC 314 generates first transaction data 316 at first device 300. Similarly, in response to initiation of electronic transaction 302, ETC 374 generates merchant transaction data 376 at merchant device 370. First transaction data 316 and merchant transaction data 376 include information that identifies a particular transaction service (i.e., transaction service 330) to be used to process electronic transaction 302 and authorizes that particular transaction service to perform/execute electronic transaction 302. In the illustrated embodiment, ETC 314 and ETC 374 are configured to process electronic transaction 302 via a same transaction service (transaction service 330). In another embodiment, transaction service 330 may include multiple transaction services and/or ETC 314 and ETC 374 may be configured to process electronic transaction 302 via different transaction services. In this alternate embodiment, the different transaction services collaborate/intercommunicate to facilitate the processing and completion of electronic transaction 302 and one or more of the different transaction services may communicate with merchant device 370 and first device 300 (via second device 320 and data pipe 350).

In order to process electronic transaction 302, transaction service 330 must first receive both transaction data 316 from first device 300 and merchant transaction data 376 from merchant device 370. In one embodiment, execution of electronic transaction 302 by transaction service 330 may result in an exchange of funds between a first party associated with first device 300 and a merchant and/or second party associated with merchant device 370. It should be noted that either of first device 300 and merchant device 370 may be the sender or recipient of funds in electronic transaction 302.

As provided by the illustrated embodiment in FIG. 3, primary connection 312 between first device 300 and transaction service 330 does not meet connection service criteria 304, as explained in greater detail below, and is thus illustrated as broken for simplicity. While a broken connection does meet the definition of one that fails to meet the connection service criteria 304, it is to be understood that failure of a device to meet the connection service criteria 304 also applies to conditions where a connection exists (i.e., is not severed), but does not meet certain pre-established quality and/or security or other requirements to allow the transaction data 316/376 to be routed over the connection. In the embodiment illustrated by FIG. 3, first device 300 is configured to detect transaction trigger 306, which indicates that an electronic transaction is likely to occur and which triggers the establishment of data pipe 350. In one or more embodiments of the invention, transaction trigger 306 includes an exchange of transaction information (e.g., an invoice or request to pay for goods or services) and/or authentication codes between first device 300 and merchant device 370 by any wired or wireless means (e.g., over an NFC connection, Bluetooth® connection, or wireless ad hoc network). For example, CSU 117 may generate transaction trigger 306 in response to first device 300 reaching a checkout stage of an electronic transaction to purchase goods, such as movie tickets. In this embodiment, CSU 117 identifies a request for entry of checkout data, such as billing and/or shipping information, that is associated with electronic transaction 302. In response to identifying the request for entry of the checkout data, CSU 117 generates transaction trigger 306.

In another embodiment, transaction trigger 306 may be received at first device 300 from merchant device 370. For example, a transaction trigger received at first device 300 from merchant device 370 may include an invoice. In another embodiment, a transaction trigger received at first device 300 from merchant device 370 may include instructions to initiate a checkout procedure with merchant device 370. In another embodiment, transaction trigger 306 may be a physical touching of first device 300 and merchant device 370, such as a physical tapping of first device 300 and merchant device 370, which tapping causes the transaction information (or transaction initiation data) to be exchanged between first device 300 and merchant device 370 via an NFC connection. In another embodiment, transaction trigger 306 may include a request from merchant device 370 and/or a user of first device 300 to initiate electronic transaction 302. In another example where merchant device 370 is a point-of-sale (POS) terminal associated with a particular merchant, transaction trigger 306 may include initialization instructions/procedures for an electronic transaction associated with the particular merchant.

In another embodiment, CSU 117 may generate transaction trigger 306 in response to identifying a particular event. For example, CSU 117 may generate transaction trigger 306 in response to determining that first device 300 is located in a same geographic location that is associated with the particular merchant having merchant device 370. In this embodiment, CSU 117 may read location data associated with first device 300 to determine a current geographic location of first device 300. The current geographic location of first device 300 may then be compared to a geographic location that is associated with a particular merchant (e.g., a retail store associated with a particular retailer). In response to determining that the current geographic location of the first device 300 matches a geographic location that is associated with the particular merchant, CSU 117 generates transaction trigger 306. In still another embodiment, CSU 117 may generate transaction trigger 306 in response to determining that first device 300 does not have a connection to transaction service 330 that satisfies connection service criteria 304. In this embodiment, CSU 117 evaluates at least one wireless and/or wired network connection (e.g., primary connection 312) to determine whether the evaluated connections meet connection service criteria 304. In one or more embodiments, CSU 117 may display an alert on first device 300 in response to determining primary connection 312 does not meet connection service criteria 304. In another embodiment, CSU 117 may display an alert on first device 300 in response to determining secondary connection 322 and/or a connection associated with at least one other intermediary device does not meet and/or no longer meets connection service criteria 304. In still another embodiment, CSU 117 may display an alert on first device 300 in response to selecting another intermediary device to replace second device 320 due to secondary connection 322 and/or a connection associated with second device 320 no longer meeting connection service criteria 304.

In another embodiment, CSU 117 may monitor location data associated with first device 300 and/or receive location data associated with merchant device 370. In this embodiment, CSU 117 generates transaction trigger 306 in response to determining first device 300 and/or merchant device 370 is within a predetermined distance of a target location 308. Target location 308 may include a location associated with first device 300, merchant device 370, and/or a merchant location (such as a retail store or office) or a service location associated with electronic transaction 302 (e.g., a drop-off location, customer residence, delivery location, office/store location, etc.). In one embodiment, CSU 117 may identify or receive target location 308 from at least one application executing on first device 300 (e.g., a GPS application, e-commerce application, or ride-share application). In another embodiment, first device 300 may receive an identification of target location 308 from another device, including second device 320 and/or merchant device 370. For example, CSU 117 may identify target location as a scheduled delivery location of a fast food order and monitors location data associated with a device (merchant device 370) used by a delivery employee at the fast food company. In this example, first device 300 may receive location data associated with merchant device 370. In one embodiment, this location data may be sent directly to first device 300 from merchant device 370 via any wired or wireless connection. Alternatively, location data associated with merchant device 370 may be routed to first device 300 via a third party, including a server (e.g., server 165) second device 320. In another embodiment, an application executing on first device 300 that is associated with a merchant corresponding to merchant device (e.g., a cellular phone application installed on first device 300) may access and/or retrieve the location data associated with merchant device 370. In response to determining the food delivery employee is within a predetermined distance (e.g., 1 mile) of the scheduled delivery location, CSU 117 automatically generates transaction trigger 306. Thus, first device 300 may use data pipe 350 to commence electronic transaction 302 as soon as the food delivery employee (and corresponding merchant device 370) arrives at target location 308.

In another example, first device 300, second device 320, and merchant device 370 are all located in a taxi associated with a commercial taxi driving company. In this example, first device 300 is associated with a user that is a passenger in the taxi, second device 320 is associated with a companion of the user that is also a passenger in the taxi, and merchant device 370 is associated with the taxi driver. In response to determining the taxi is within a predetermined distance (e.g., 2 miles) of the scheduled destination (target location 308) of the taxi ride, CSU 117 automatically generates transaction trigger 306. It should be appreciated that while merchant device 370 is associated with a commercial taxi driving company in this example, in alternate embodiments merchant device 370 may be associated with another type of business and/or an individual.

In another embodiment, CSU 117 may receive an identification of a target time (not pictured) from another device, including second device 320 and/or merchant device 370. The target time identifies a time associated with commencement of electronic transaction 302 (e.g., an estimated delivery time, a transaction processing time, etc.). In this embodiment, CSU 117 monitors a current time and automatically generates transaction trigger 306 in response to current time reaching the target time or a predetermined amount of time before or after the target time.

In response to detecting transaction trigger 306, CSU 117 accesses authorization list 336. Authorization list 336 identifies at least one intermediary device (e.g., devices 252*a-n*) that supports the establishment of data pipe 350 with first device 300. In one embodiment, intermediary devices identified in authorization list 336 are pre-authorized by a user of first device 300 and may include devices associated with a same user or a different user as the user of first device 300. For example, authorization list 336 may identify devices associated with family of a user of first device 300. In another embodiment, authorization list 336 may identify devices associated with a particular party and/or corporation that is also associated with first device 300 and/or a user of first device 300. For example, authorization list 336 may identify devices associated with coworkers of the user associated with first device 300. In one or more embodiments, authorization list 336 may be shared and/or maintained by one or more other individuals that are associated with one or more other devices (which may or may not be included on authorization list 336). For example, intermediary devices included on authorization list 336 may be established by a manager of an organization to which the user of first device 300 belongs.

In one embodiment, CSU 117 may utilize one or more wireless radios of first device 300 to scan within a proximate area for the intermediary devices identified on authorization list 336. For example, CSU 117 may scan, for intermediary devices identified on authorization list 336 using a Bluetooth® radio and/or another wireless radio of first device 300. In response to identifying at least one intermediary device within the proximate area, first device 300 determines whether the at least one intermediary device has a connection (e.g., secondary connection 322) that is suitable for the exchange of data with transaction service 330 and that that satisfies connection service criteria 304. In another embodiment, in response to identifying at least one intermediary device within the proximate area, CSU 117 determines whether the at least one intermediary device is currently connected to transaction service 330 using at least one connection (secondary connection 322) that satisfies connection service criteria 304. In another embodiment, in response to identifying at least one intermediary device within the proximate area, CSU 117 triggers the establishment of secondary connection 322 with transaction service 330 and sends a request to second device 320 that causes second device 320 to perform a testing of secondary connection 322, to determine whether secondary connection 322 satisfies connection service criteria 304. Second device 320 may then return the results of the test to first device 300. In another embodiment, instead of sending a request to second device 320 that causes second device 320 to perform a testing of secondary connection 322, first device 300 may receive, responsive to the scanning of the proximate area, a notification from second device 320 that identifies whether secondary connection 322 satisfies connection service criteria 304.

In response to identifying at least one intermediary device(s) within the proximate area that satisfies connection service criteria 304, CSU 117 selects second device 320 from among the at least one intermediary device(s) within the proximate area that are determined to have a connection that satisfies connection service criteria 304. In one embodiment, CSU 117 may select second device 320 based on a predetermined selection criteria. For example, CSU 117 may select a particular proximate intermediary device as second device 320, from among multiple available second devices, based on the particular proximate intermediary device being associated with a particular individual or organization. In another example, CSU 117 may select a particular proximate intermediary device as second device 320, from among multiple available second devices, based on the particular proximate intermediary device being within a preferred proximity of first device 300 and/or having secondary connection 322 which meets a particular set of speed, signal strength, and/or stability requirements.

In one or more embodiments, in response to identifying at least one intermediary device within the proximate area, CSU 117 may issue, to the at least one intermediary device within the proximate area, approval request(s) 338, which requests the at least one intermediary device approve the establishment of data pipe 350 with first device 300. First device 300 may then receive approval response(s) 339, which indicates whether an associated intermediary device approves the establishment of data pipe 350 with first device 300. In response to receiving approval response(s) 339, CSU 117 analyzes approval response(s) 339 to determine which responding intermediary device(s) approve the establishment of data pipe 350 with first device 300, and CSU 117 selects second device 320 from among those responding intermediary device(s).

In the illustrated embodiment, second device 320 is connected to transaction service 330 via secondary connection 322 that meets connection service criteria 304. In response to selecting second device 320, CSU 117 transmits secure initiation trigger 340 to second device 320. Secure initiation trigger 340 includes instructions that, when received by second device 320, causes second device 320 to establish data pipe 350 with first device 300. Secure initiation trigger 340 also includes configuration instructions 342 that, when received at second device 320, triggers second device 320 to configure messaging client 324, to route transaction data 316 received at second device 320 to transaction service 330. Additionally, secure initiation trigger 340 may also identify the particular transaction service (i.e., transaction service 330) to be used to process electronic transaction 302.

Data pipe 350 represents any connection medium between first device 300 and second device 320 that can be or is used by first device 300 to transmit transaction data 316 for electronic transaction 302 to second device 320. In one embodiment, data pipe 350 is a direct connection between first device 300 and second device 320 including, but not limited to, an NFC connection, Bluetooth® connection, wireless ad hoc network, or infrared connection. Data pipe 350 may be provided via a same or different connection than was previously used to initiate electronic transaction 302 and/or exchange approval request(s) 338, approval response(s) 339, and/or secure initiation trigger 340. For example, an NFC connection may be used to initiate electronic transaction 302 and a Bluetooth® connection is used to establish data pipe 350. In another example, a mobile hotspot and/or tethering connection used to establish data pipe 350 may also be used to exchange approval request(s) 338, approval response(s) 339, and secure initiation trigger 340. In another embodiment, data pipe 350 may be an indirect connection between first device 300 and second device 320, such an indirect wireless connection, facilitated by a wireless router (not pictured).

In one or more embodiments, data pipe 350 may be restricted to being only utilized to transmit transaction data 316 and/or data associated with transaction service 330, electronic transaction 302, and/or a messaging client (e.g., ETC 314 and messaging client 324). In one embodiment, first device 300 may block any outbound communications that do not include transaction data and/or that are not associated with ETC 314, transaction 302, and/or transaction service 330. In another embodiment, configuration instructions 342 provided by first device 300 to second device 320 may trigger second device 320 to configure messaging client 324 to filter out and/or reject any received communications from first device 300 over data pipe 350 other than transaction data 316, and/or communication that is not associated with electronic transaction 302 and/or transaction service 330. A unique identification may be provided within the header of transaction data 316 that identifies the specific data as being a part of electronic transaction 302.

In response to commencement of electronic transaction, first device 300 transmits transaction data 316 to second device 320. Upon receipt of transaction data 316, second device 320 automatically routes transaction data 316 to transaction service 330. It should also be noted that in one or more embodiments, commencement of electronic transaction 302 occurs at a time after data pipe 350 is established with second device 320. In those embodiments, CSU 117 may establish data pipe 350 with second device 320 prior to the actual initiation/commencement of electronic transaction 302. For example, transaction trigger 306 may be generated by CSU 117 in response to detecting first device 300 has entered a location that is associated with a known retail store (having merchant device 370). Thus, data pipe 350 may be preemptively established in anticipation of a potential electronic transaction to ensure that first device 300 is capable of completing electronic transaction 302 should a user of first device 300 decide to make a purchase.

In one or more embodiments, configuration instructions 342 may also include instructions that trigger second device 320 to configure messaging client 324 to route to first device 300, via data pipe 350, receipt 318 that includes a payment confirmation and/or transaction receipt that is associated with electronic transaction 302 and that is intended for first device 300. For example, after processing of electronic transaction 302 by transaction service 330 using transaction data 316 and merchant transaction data 376, second device 320 may receive receipt 318. In response to receiving receipt 318, via secondary connection 322, second device 320 may route receipt 318 to first device 300, via data pipe 350. In one or more embodiments, in response to receiving receipt 318, first device 300 may automatically disconnect data pipe 350. In an alternate embodiment, in response to determining all of transaction data 316 has been received at second device 320, via data pipe 350, first device 300 may automatically disconnect data pipe 350. In another embodiment, in response to determining all of transaction data 316 has been routed to transaction service 330 via secondary connection 322, device 300 may automatically disconnect data pipe 350. In another embodiment, in response to determining that a pre-established amount of time has elapsed without receiving receipt 318 and/or a confirmation that all of transaction data 316 has been received at second device 320 via data pipe 350 and/or routed to transaction service 330 via secondary connection 322, CSU 117 may automatically resend transaction data 316 to second device 320 via data pipe 350. In an alternate embodiment, CSU 117 selects another intermediary device as second device 320 and re-initiates the connection protocol and subsequent transmission of transaction data.

In one embodiment, first transaction data 316 and/or merchant transaction data 376 may be encrypted using an encryption key (and/or hash code) that is shared between a corresponding device and transaction service 330. In this embodiment, in response to receiving first transaction data 316 and/or merchant transaction data 376, transaction service 330 may first decrypt first transaction data 316 and/or merchant transaction data 376 using the shared encryption keys, prior to executing electronic transaction 302.

While the methods and functions of CSU 117 are described above as being executed on first device 300, in another embodiment, merchant device 370 may also execute CSU 117 on a processor to perform at least one of the above methods and/or functions. For example, if merchant connection 372 is broken and/or does not meet connection service criteria 304, merchant device 370 may also establish a data pipe with another device, including, but not limited to, second device 320, which may be used to route data via a connection of the other device to transaction service 330. In still another embodiment, merchant device 370 may also fulfill the role of second device 320 and first device may establish data pipe 350 with merchant device 370 for sending transaction data 316 to transaction service 330 via merchant connection 372.

Figure 4:
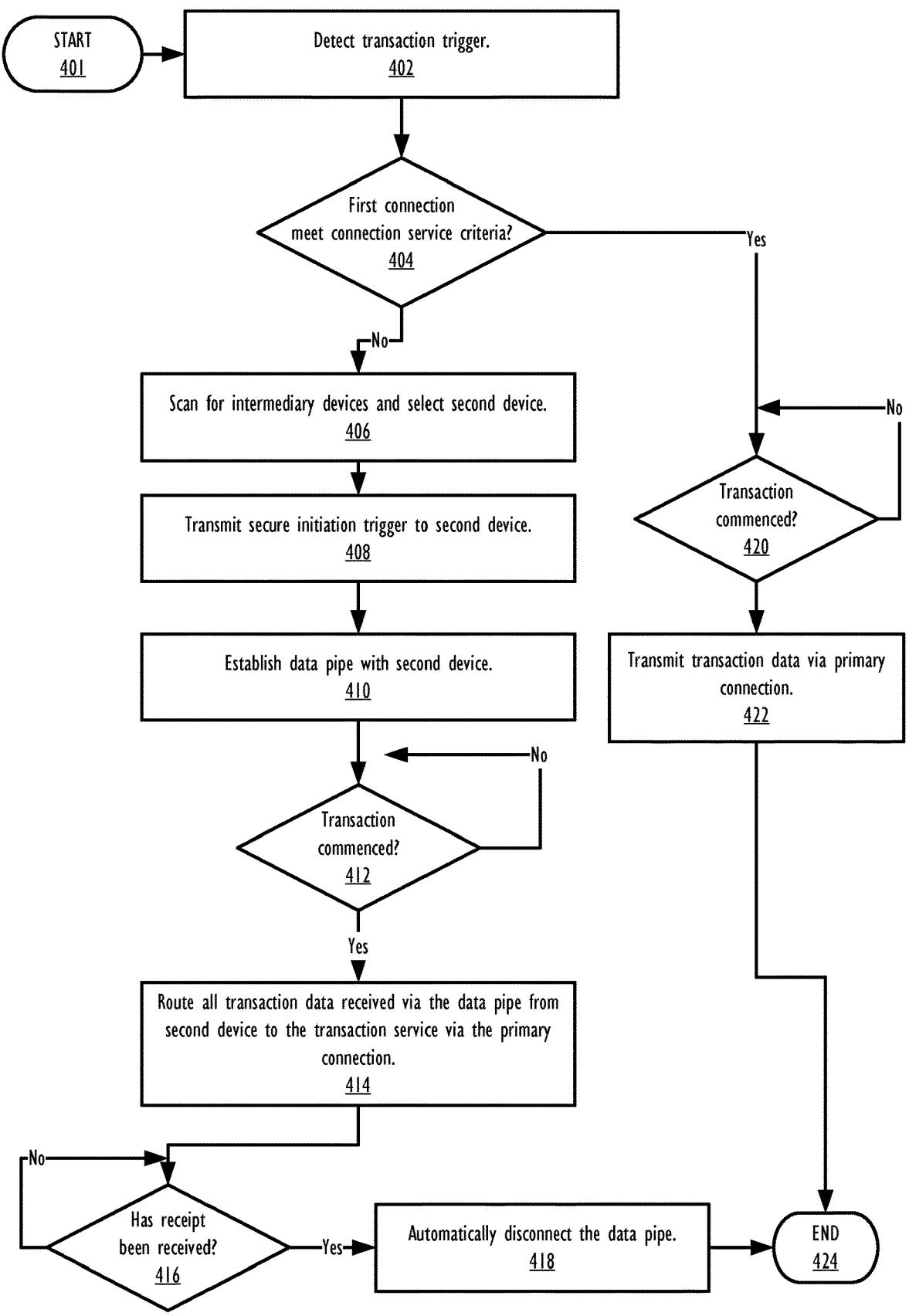
FIG. 4 is a flow chart illustrating a method for transmitting transaction data associated with an electronic transaction and intended for the transaction service, in accordance with one or more embodiments.

Referring now to FIG. 4, there is depicted a high-level flow-chart illustrating a method for transmitting, from a first device to a second device, transaction data associated with an electronic transaction and intended for transaction service, in accordance with one or more embodiments of the present disclosure. Aspects of the method are described with reference to the components of FIGS. 1-3. Several of the processes of the method provided in FIG. 4 can be implemented by a processor (e.g., CPU 104 or CPU 204) executing software code of respective CSU 117 within a generic data processing system (e.g., FIG. 1) or portable device (e.g., FIG. 2). The method processes described in FIG. 4 are generally described as being performed by first device 300.

Method 400 commences at initiator block 401 then proceeds to block 402. At block 402, first device 300 detects transaction trigger 306, which indicates an electronic transaction between first device 300 and merchant device 370 may occur. At block 404, first device 300 determines whether primary connection 322 between first device 300 and transaction service 330 meets connection service criteria 304. In response to determining primary connection 322 meets connection service criteria 304, method 400 then proceeds to block 420 and first device 300 determines whether electronic transaction 302 has commenced. In response to determining electronic transaction 302 has commenced, transaction data 316 is sent to transaction service 330 using primary connection 312 (block 422). The method then terminates at block 424. In response to determining primary connection 322 fails to meet connection service criteria 304, method 400 proceeds to block 406.

At block 406, first device 300 scans a proximate area for intermediary devices and selects, from among at least one proximate intermediary device, second device 320, which has a secondary connection to the transaction service that meets the connection service criteria 304. In response to identifying second device 320 at block 406, first device 300 generates and transmits, to second device 320, secure initiation trigger 340, which includes configuration instructions 342 to configure and/or trigger an application on second device 320 to configure messaging client 324 to reroute transaction data 316 received from first device 300 to transaction service 330 (block 408). At block 410, data pipe 350 is established between first device 300 and second device 320. Method 400 then proceeds to block 412 and first device 300 determines whether electronic transaction 302 has commenced.

In response to determining electronic transaction has commenced, first device 300 routes transaction data 316, which is associated with electronic transaction 302 and intended for transaction service 330, to second device 320 for rerouting to transaction service 330 (block 414). At block 416, first device 300 determines whether receipt 318, which indicates transaction 302 has been completed by transaction service 330, has been received. In response to determining receipt 318 has been received, first device 300 automatically disconnects data pipe 350 (block 418). Method 400 then terminates at block 424.

Figure 5:
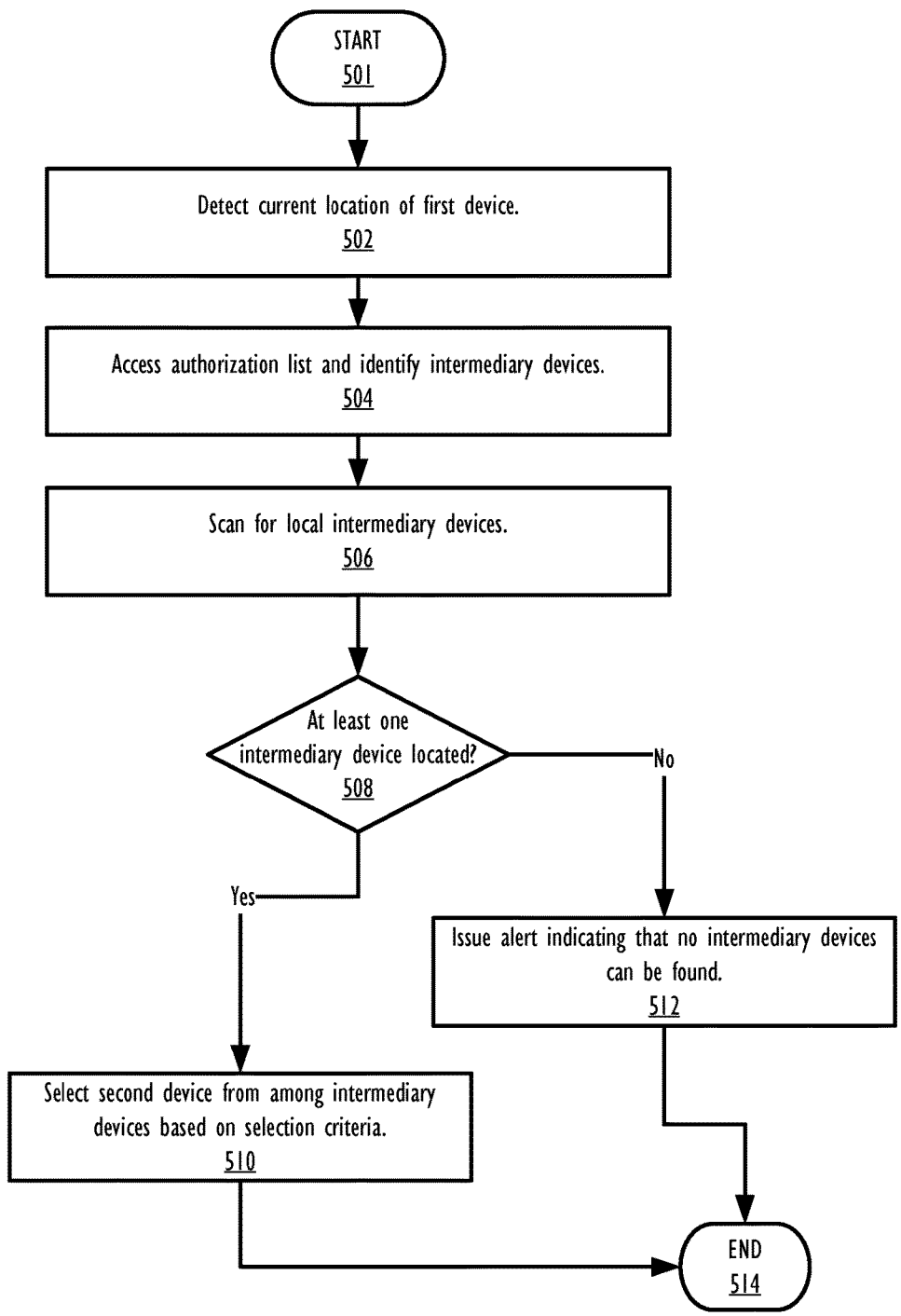
FIG. 5 is a flow chart illustrating a method for locating, from among a plurality of local intermediary devices, a second device for rerouting transaction data to a transaction service, in accordance with one or more embodiments.

Referring now to FIG. 5, there is depicted a high-level flow-chart illustrating a method for locating a second device for establishment of a data pipe, in accordance with one or more embodiments of the present disclosure. Aspects of the method are described with reference to the components of FIGS. 1-3. Several of the processes of method 500 provided in FIG. 5 can be implemented by a processor (e.g., CPU 104 or CPU 204) executing software code of respective CSU 117 within a generic data processing system (e.g., FIG. 1) or portable device (e.g., FIG. 2). The method processes described in FIG. 5 are generally described as being performed by first device 300.

Method 500 commences at initiator block 501, then proceeds to block 502. At block 502, CSU 117 detects/determines a current location of first device 300. At block 504, first device 300 accesses authorization list 336 to identify at least one intermediary device that supports the establishment of data pipe 350 with first device 300. At block 506 first device 300 scans within a proximate area for the intermediary devices identified on authorization list 336. At block 508, first device 300 determines whether at least one intermediary device has been located within the proximate area. In response to determining that no intermediary device have been located within the proximate area, first device 300 issues an alert to at least one output device that indicates that no intermediary devices can be found (block 512). Method 500 then terminates at end block 514. In response to determining that at least one intermediary device has been located within the proximate area, first device 300 selects a second device from among the located intermediary devices based on a predetermined selection criteria (block 510). Method 500 then terminates at block 514.

Figure 6:
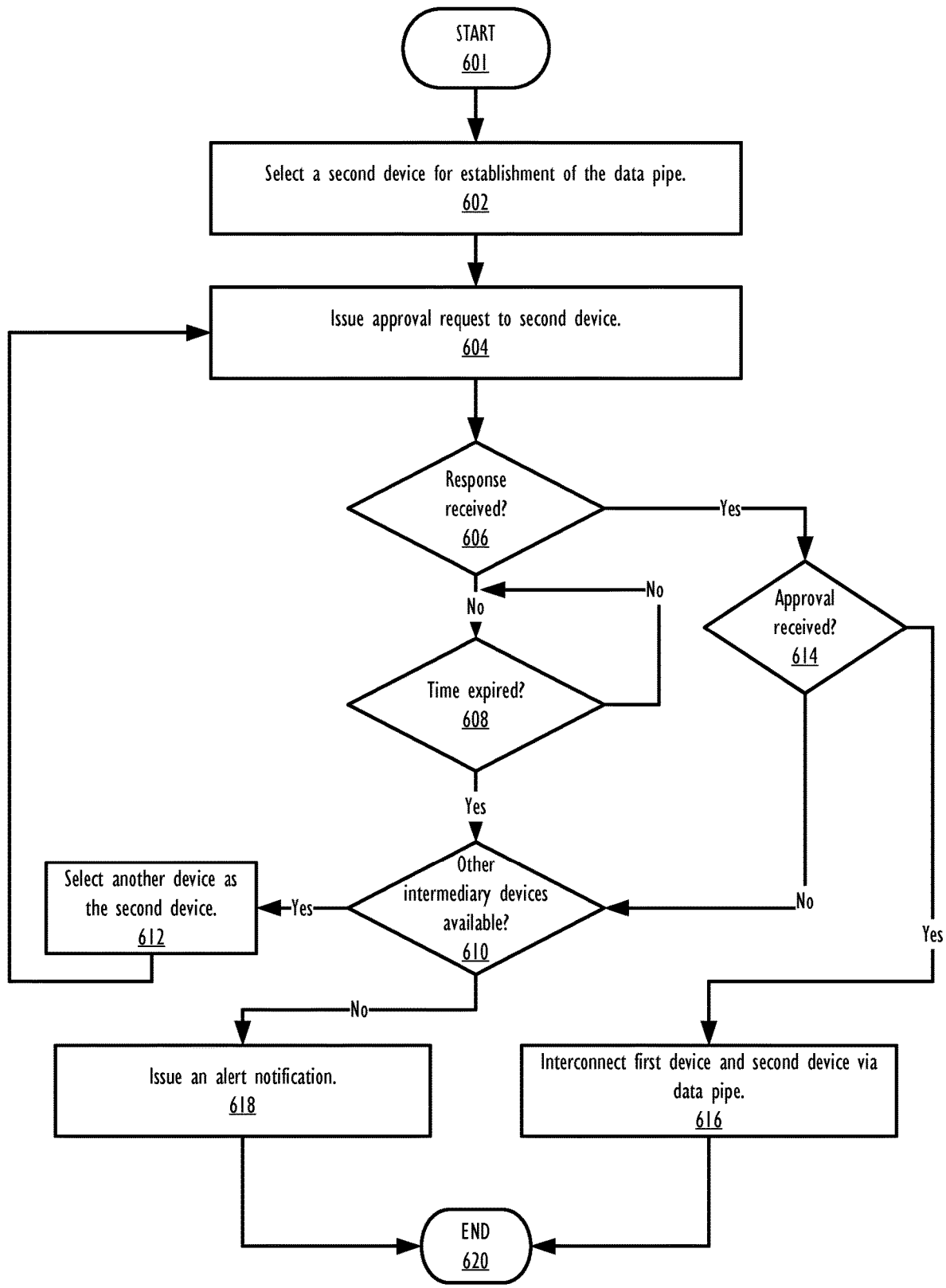
FIG. 6 is a flow chart illustrating a method for requesting approval of a second device for the establishment of a data pipe with a first device to reroute transaction data for an electronic transaction to a transaction service, in accordance with one or more embodiments.

Referring now to FIG. 6, there is depicted a high-level flow-chart illustrating a method for requesting approval of a second device for the establishment of a data pipe with a first device, in accordance with one or more embodiments of the present disclosure. Aspects of the method are described with reference to the components of FIGS. 1-3. Several of the processes of method 600 provided in FIG. 6 can be implemented by a processor (e.g., CPU 104 or CPU 204) executing software code of respective CSU 117 within a generic data processing system (e.g., FIG. 1) or portable device (e.g., FIG. 2). The method processes described in FIG. 6 are generally described as being performed by first device 300.

Method 600 commences at initiator block 601 then proceeds to block 602. At block 602, first device 300 selects an intermediary device from among at least one proximate intermediary device(s) as second device 320. At block 604, first device issues, to second device 320, approval request 338, which requests the at least one intermediary device approve the establishment of data pipe 350 with first device 300. At block 606, first device 300 determines whether approval response 339 to approval request 338 has been received. In response to determining approval response 339 has not been received, first device 300 determines whether a predetermined amount of time has expired since approval request 338 was issued to second device 320 (block 608). In response to determining the predetermined amount of time has expired, first device 320 determines whether at least one proximate intermediary device(s) is available (block 610). In response to determining no proximate intermediary device(s) is available, first device 300 issues an alert/notification to at least one output device of first device 300 (block 618). In response to determining at least one proximate intermediary device(s) is available, first device 300 selects another intermediary device from among at least one proximate intermediary device(s) as second device 320 (block 612). Method 600 then returns to block 604.

In response to determining at block 606 that approval response 339 has been received, first device 300 determines whether approval response 339 approves the establishment of data pipe 350 between second device 320 and first device 300 (block 614). In response to determining approval response 339 does not approve the establishment of data pipe 350, method 600 continues to block 610. In response to determining approval response 339 approves the establishment of data pipe 350, first device 300 establishes data pipe 350 with second device 320 (block 616). Method 600 then terminates at block 620.

Figure 7:
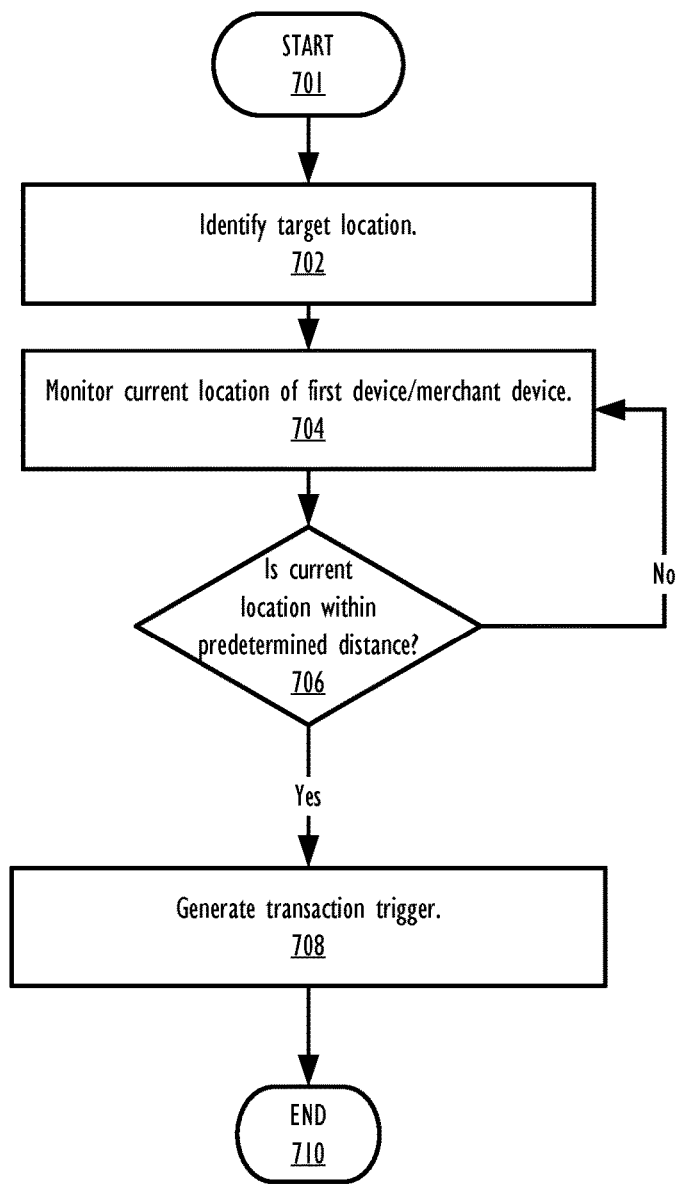
FIG. 7 is a flow chart illustrating a method for generating a transaction trigger associated with a target location of an electronic transaction, in accordance with one or more embodiments.

Referring now to FIG. 7, there is depicted a high-level flow-chart illustrating a method for generating a transaction trigger associated with a target location of an electronic transaction, in accordance with one or more embodiments of the present disclosure. Aspects of the method are described with reference to the components of FIGS. 1-3. Several of the processes of method 700 provided in FIG. 7 can be implemented by a processor (e.g., CPU 104 or CPU 204) executing software code of respective CSU 117 within a generic data processing system (e.g., FIG. 1) or portable device (e.g., FIG. 2). The method processes described in FIG. 7 are generally described as being performed by first device 300.

Method 700 commences at initiator block 701 then proceeds to block 702. At block 702, first device 300 identifies a target location that is associated with at least one of: a location of first device 300, a location of merchant device 370, a merchant location, and/a service location associated with electronic transaction 302. In response to identifying target location 308, first device 300 monitors a current location of at least one particular device from among first device 300 and merchant device 370 (block 704). At block 706, first device 300 determines whether the current location of the particular device is within a predetermined distance of target location 308. In response to determining the current location of the particular device is within a predetermined distance of target location 308, first device 300 generates transaction trigger 306, which initiates the establishment of data pipe 350 with a located second device 320 (block 708). Method 700 the terminates at block 710.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:

detecting, at a first device, a transaction trigger that indicates an electronic transaction may occur between the first device and a merchant device, wherein the electronic transaction is remotely processed by a transaction service, and wherein the first device does not currently have a connection to the transaction service that meets a connection criteria for processing the electronic transaction, the connection criteria identifying, for connections to the transaction service, at least one of: at least one permitted type of connection, at least one restricted type of connection, a minimum connection security level, and an amount of data that is required to be transmitted and received to complete the electronic transaction;

identifying a second device that is within a predetermined proximity of the first device and that has a secondary connection to the transaction service that meets the connection criteria, wherein the second device is not associated with the electronic transaction and wherein the transaction service is independent of and remote from a merchant device with which the first device initiates the electronic transaction and the transaction service processes electronic transactions between the first device and the merchant device in response to receiving transaction data and merchant transaction data, respectively, from respective electronic transaction clients (ETC) of the first device and the merchant device;

establishing a data pipe that directly connects the first device and a second device to enable transfer of transaction data between the first and second devices while the connection of the first device to the transaction service does not meet the connection criteria, the establishing of the data pipe comprising transmitting a secure initiation trigger to the second device, the secure initiation trigger including instructions that, when received by second device, causes second device to establish the data pipe with the first device, the secure initiation further including configuration instructions that, when received at the second device, triggers the second device to configure a messaging client on the second device, receive the transaction data from the first device, and route the transaction data received from the first device to the transaction service that is identified within the secure initiation trigger to process the electronic transaction; and in response to commencement of the electronic transaction while the connection of the first device to the transaction service does not meet the connection criteria, the first device routing, to the second device over the data pipe, the transaction data associated with the electronic transaction and intended for delivery to the transaction service, the transaction data comprising information that (i) identifies the transaction service and (ii) authorizes the transaction service to perform the electronic transaction, wherein the second device reroutes the transaction data received over the data pipe to the transaction service via the secondary connection to complete at least one portion of the electronic transaction involving transfer of the transaction data from the first device to the transaction service.

2. The method of claim 1, further comprising:
automatically disconnecting the data pipe in response to identifying that all transaction data for the electronic transaction has been received by the transaction service from the second device.

3. The method of claim 1, wherein identifying the second device further comprises:
determining a current location of the first device;
accessing an authorization list to identify a plurality of intermediary devices that support the establishment of the data pipe with the first device;
scanning for the plurality of intermediary devices within a proximate area associated with the current location of the first device; and
in response to identifying at least one intermediary device, from among the plurality of intermediary devices, within the proximate area, selecting, as the second device, an intermediary device from among the at least one intermediary device based on at least one selection criteria.

4. The method of claim 3, wherein establishing the data pipe further comprises:
issuing, to the second device, an approval request to approve the establishment of the data pipe;
receiving a response to the approval request;
in response to determining the response approves the establishment of the data pipe, interconnecting the first device and the second device via the data pipe; and
in response to determining the response does not approve the establishment of the data pipe, selecting as the second device, based on the predetermined selection criteria, another device from among the at least one intermediary device.

5. The method of claim 1, further comprising:
monitoring a geographic location of the first device; and
in response to determining a current geographic location of the first device matches a geographic location associated with a particular merchant, generating the transaction trigger at the first device, wherein the transaction trigger indicates that the first device is located in the geographic location associated with the particular merchant having the merchant device.

6. The method of claim 1, further comprising:
monitoring a current location of at least one device from among the first device and the merchant device;
identifying a target location that is associated with the electronic transaction;
determining whether the current location indicates that the at least one device is within a predetermined distance of the target location; and
in response to determining the at least one device is within the predetermined distance of the target location, generating the transaction trigger at the first device, wherein the transaction trigger indicates that the at least one device is located within the predetermined distance of the target location.

7. The method of claim 1, further comprising:
determining whether a connection between the first device and the transaction service meets the connection criteria; and
in response to determining the connection does not meet the connection criteria, generating the transaction trigger at the first device to indicate that the connection does not meet the connection criteria.

8. The method of claim 1, wherein the transaction trigger includes a request from the merchant device to initiate the electronic transaction.

9. A first device comprising:
a memory;
a processor that is coupled to the memory and which:
detects a transaction trigger that indicates an electronic transaction may occur between the first device and a merchant device; and
identifies that the first device does not currently have a connection to the transaction service that meets a connection criteria for processing the electronic transaction, the connection criteria identifying, for connections to the transaction service, at least one of: at least one permitted type of connection, at least one restricted type of connection, a minimum connection security level, and an amount of data that is required to be transmitted and received to complete the electronic transaction;
at least one transceiver communicatively coupled to the processor and which identifies at least one second device that is within a predetermined proximity of the first device, wherein the at least one second device is not associated with the electronic transaction;
wherein the processor:
determines whether one second device of the at least one second device has a secondary connection to the transaction service that meets the connection criteria, wherein the transaction service is independent of and remote from a merchant device with which the first device initiates the electronic transaction and the transaction service processes electronic transactions between the first device and the merchant device in response to receiving transaction data and merchant transaction data, respectively, from respective electronic transaction clients (ETC) of the first device and the merchant device; and
in response to determining the second device meets the connection criteria, generates a secure initiation trigger which includes instructions to configure a messaging client of the second device to receive, via a data pipe, the transaction data intended for a transaction service and reroute all transaction data received via the data pipe to the transaction service via the secondary connection; and in response to detecting the generation of the secure initiation trigger, the at least one transceiver:
  transmits the secure initiation trigger to the second device;
  establishes the data pipe that directly connects the first device with the second device while the connection of the first device to the transaction service does not meet the connection criteria; and
  in response to commencement of the electronic transaction while the connection of the first device to the transaction service does not meet the connection criteria, reroutes transaction data associated with the electronic transaction to the second device over the data pipe, the transaction data intended for delivery from the first device to the transaction service, the transaction data comprising information that (i) identifies the transaction service and (ii) authorizes the transaction service to perform the electronic transaction, wherein the second device reroutes the transaction data received over the data pipe to the transaction service via the secondary connection to complete at least one portion of the electronic transaction involving transfer of the transaction data from the first device to the transaction service.

10. The first device of claim 9, wherein:
the processor:
  determines whether all transaction data for the electronic transaction has been received by the transaction service from the second device; and
  in response to determining all transaction data for the electronic transaction has been received by the transaction service, issues a disconnection request to the at least one transceiver; and
  in response to receiving the disconnection request, the at least one transceiver automatically disconnects the data pipe;
wherein the second device is not associated with the electronic transaction.

11. The first device of claim 9, wherein in identifying the second device:
  the at least one transceiver determines a current location of the first device;
  the processor accesses an authorization list to identify a plurality of intermediary devices that support the establishment of the data pipe with the first device;
  the at least one transceiver scans for the plurality of intermediary devices within a proximate area associated with the current location of the first device; and
  in response to the scan for the plurality of intermediary devices identifying at least one intermediary device, from among the plurality of intermediary devices, within the proximate area, the processor selects, as the second device, an intermediary device from among the at least one intermediary device based on at least one selection criteria.

12. The first device of claim 11, wherein in establishing the data pipe:
  the at least one transceiver:
    issues, to the second device, an approval request to approve the establishment of the data pipe; and
    receives a response to the approval request; and
  the processor:
    in response to determining the response approves the establishment of the data pipe, interconnects the first device and the second device via the data pipe; and
    in response to determining the response does not approve the establishment of the data pipe, selects as the second device, based on the predetermined selection criteria, another device from among the at least one intermediary device.

13. The first device of claim 9, wherein:
the at least one transceiver identifies a geographic location of the first device; and
the processor:
  receives, from the at least one transceiver, location data including the geographic location of the first device;
  determines, based on the location data, whether the first device is located in a geographic location associated with a particular merchant having the merchant device; and
  in response to determining the first device is located in the geographic location associated with the particular merchant, generates the transaction trigger at the first device, wherein the transaction trigger indicates that the first device is located in the geographic location associated with the particular merchant.

14. The first device of claim 9, wherein:
the at least one transceiver identifies a current location of at least one device from among the first device and the merchant device; and
the processor:
  receives, from the at least one transceiver, location data including the current location of the at least one device;
  identifies a target location that is associated with the electronic transaction;
  determines whether the current location indicates that the at least one device is within a predetermined distance of the target location; and
  in response to determining the at least one device is within the predetermined distance of the target location, generates the transaction trigger at the first device, wherein the transaction trigger indicates that the at least one device is located within the predetermined distance of the target location.

15. The first device of claim 9, wherein the processor:
  determines whether a connection between the first device and the transaction service meets the connection criteria; and
  in response to determining the connection does not meet the connection criteria, generates the transaction trigger at the first device to indicate that the connection does not meet the connection criteria.

16. The first device of claim 9, wherein the transaction trigger includes a request from the merchant device to initiate the electronic transaction.

17. A computer program product comprising:
a computer readable storage device; and
program code on the computer readable storage device that when executed by a processor associated with a first device, the program code enables the device to provide the functionality of:
  detecting, at a first device, a transaction trigger that indicates an electronic transaction may occur between the first device and a merchant device, wherein the electronic transaction is remotely processed by a transaction service, and wherein the first device does not have a connection to the transaction service that meets a connection criteria for processing the electronic transaction, the connection criteria identifying, for connections to the transaction service, at least one of: at least one permitted type of connection, at least one restricted type of connection, a minimum connection security level, and an amount of data that is required to be transmitted and received to complete the electronic transaction;

identifying a second device that is within a predetermined proximity of the first device and that has a secondary connection to the transaction service that meets the connection criteria, wherein the second device is not associated with the electronic transaction, and wherein the transaction service is independent of and remote from a merchant device with which the first device initiates the electronic transaction and the transaction service processes electronic transactions between the first device and the merchant device in response to receiving transaction data and merchant transaction data, respectively, from respective electronic transaction clients (ETC) of the first device and the merchant device;

establishing a data pipe that directly connects the first device and a second device to enable transfer of transaction data between the first and second devices while the connection of the first device to the transaction service does not meet the connection criteria, the establishing of the data pipe comprising transmitting a secure initiation trigger to the second device, the secure initiation trigger including instructions that, when received by second device, causes second device to establish the data pipe with the first device, the secure initiation further including configuration instructions that, when received at the second device, triggers the second device to configure a messaging client on the second device, receive the transaction data from the first device, and route the transaction data received from the first device to the transaction service that is identified within the secure initiation trigger to process the electronic transaction; and in response to commencement of the electronic transaction while the connection of the first device to the transaction service does not meet the connection criteria, the first device routing, to the second device over the data pipe, the transaction data associated with the electronic transaction and intended for delivery to the transaction service, the transaction data comprising information that (i) identifies the transaction service and (ii) authorizes the transaction service to perform the electronic transaction, wherein the second device reroutes the transaction data received over the data pipe to the transaction service via the secondary connection to complete at least one portion of the electronic transaction involving transfer of the transaction data from the first device to the transaction service.

18. The computer program product of claim 17, wherein the program code for identifying the second device further comprises program code that enables the first device to provide the functionality of:

determining a current location of the first device;

accessing an authorization list to identify a plurality of intermediary devices that support the establishment of the data pipe with the first device;

scanning for the plurality of intermediary devices within a proximate area associated with the current location of the first device; and in response to identifying at least one intermediary device, from among the plurality of intermediary devices, within the proximate area, selecting, as the second device, an intermediary device from among the at least one intermediary device based on at least one selection criteria.

19. The computer program product of claim 17, wherein the program code for further comprises program code that enables the first device to provide the functionality of:

monitoring a current location of at least one device from among the first device and the merchant device;

identifying a target location that is associated with the electronic transaction;

determining whether the current location indicates that the at least one device is within a predetermined distance of the target location; and in response to determining the at least one device is within the predetermined distance of the target location, generating the transaction trigger at the first device, wherein the transaction trigger indicates that the at least one device is located within the predetermined distance of the target location.

20. The computer program product of claim 17, wherein the program code further comprises program code that enables the first device to provide the functionality of:

determining whether a connection between the first device and the transaction service meets the connection criteria; and in response to determining the connection does not meet the connection criteria, generating the transaction trigger at the first device to indicate that the connection does not meet the connection criteria.

* * * * *